Nov. 16, 1954  C. B. WOODEN  2,694,588
SEAL FOR TRACTOR BEARINGS
Filed Aug. 13, 1951
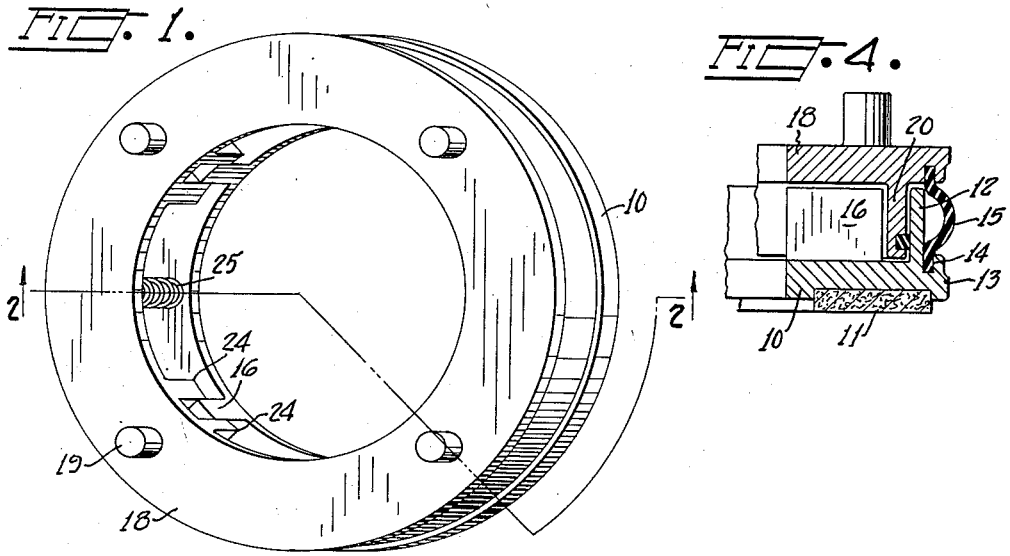
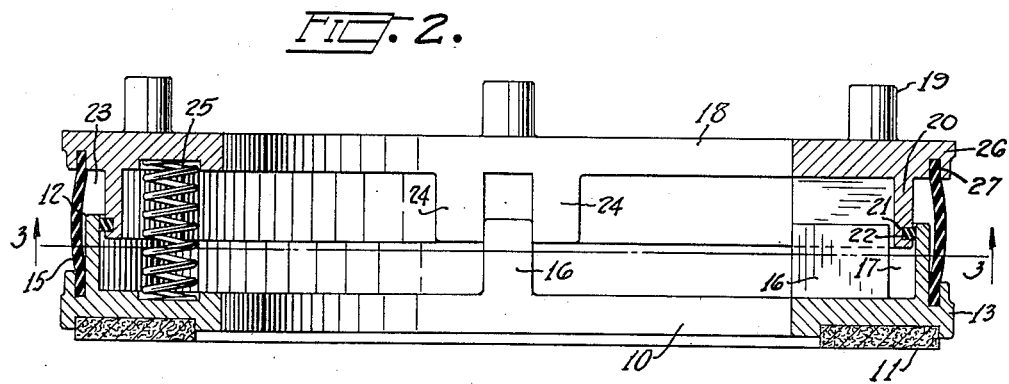
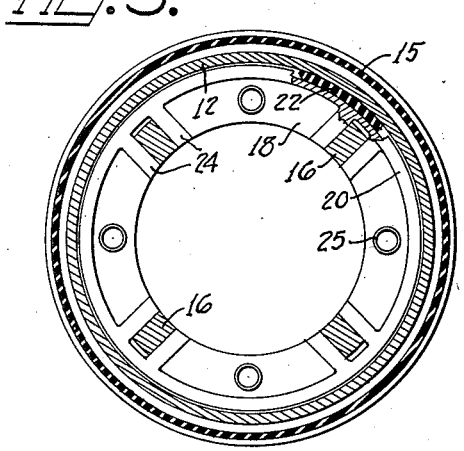
INVENTOR
CORNELIUS B. WOODEN
BY
ATTORNEY

United States Patent Office 2,694,588
Patented Nov. 16, 1954

2,694,588

SEAL FOR TRACTOR BEARINGS

Cornelius B. Wooden, Beaverton, Oreg., assignor of one-half to Gordon Dobbin, one-fourth to A. J. Cook, and one-fourth to John T. Carson, Portland, Oreg.

Application August 13, 1951, Serial No. 241,535

2 Claims. (Cl. 288—3)

This invention relates generally to tractors and particularly to a bearing seal therefor.

The main object of this invention is to provide a seal for tractor bearings which will prevent foreign substances and lubricants from passing outwardly into the sealing area, as well as protecting the bearing against the entry of foreign substances into the bearing should the main seal become inoperative.

I accomplish these and ther objects in the manner set forth in the following specifications as illustrated in the accompanying drawing, in which:

Fig. 1 is a perspective view of the bearing.

Fig. 2 is a fragmentary section taken along the line 2—2 in Fig. 1.

Fig. 3 is a section taken along the line 3—3 in Fig. 2, showing the parts in an expanded position.

Fig. 4 is a fragmentary section similar to Fig. 2 but showing the parts in a collapsed or sealing position.

Like members of reference refer to the same or similar parts throughout the several views.

Referring in detail to the drawing, there is shown a circular ring 10 having a sealing ring 11 imbedded in one side and having a cylindrical flange 12 on the opposite side thereof. The ring 10 has its outermost rim 13 extending beyond the exterior of the flange 12 and has an undercut groove 14 in which is imbedded the resilient sealing sleeve 15. The ring 10 is provided with a plurality of lugs 16 which extend laterally from the flange 12 but are separated therefrom by the circular groove 17.

Opposite the ring 10 is a second ring 18 having projecting therefrom the pins 19 which engage the corresponding holes in an adjacent member.

On the opposite side of the ring 18 is formed a cylindrical flange 20 which is inside of the flange 12 and provided with a groove 21 in which is disposed a sealing ring 22 which bears against the interior of the flange 12 and prevents the passage of lubricant into the space 23 and conversely the passage of foreign substances from the space 23 into the bearing in event the sleeve 15 becomes inoperative.

The ring 18 is provided with lugs 24 which engage opposite sides of the lug 16 for the purpose of maintaining circumferential relationship between the rings 10 and 18.

Springs 25 are placed between the rings 10 and 18 to urge the members apart.

The ring 18 has its outermost rim 26 provided with a groove 27 which also receives the sleeve 15. In practice it is customary to roll the grooved edges 13 tight against the sleeve 15 to make a permanent seal.

*The operation*

It will be noted in Fig. 2 that the parts 10 and 18 are spaced as far as the sleeve 15 will permit, in which the seal 22 is at the very edge of the flange 12, whereas in Fig. 4 the parts 10 and 18 are compressed toward each other and the sleeve 15 is flexed, while the seal 22 is closer to the inner end of the flange 12; that is, nearer the ring 10.

It can be seen from the foregoing that no lubricant or foreign substance can pass between the flanges 12 and 20 in either direction, and the bearing is thus doubly protected.

I claim:

1. A bearing seal for tractors comprising a pair of concentric rings, one of which has means for holding it in a fixed position and the other having means for frictionally engaging a rotating element, said rings having formed on their adjacent faces telescopic flanges, the inner flange having a sealing ring disposed therein engaging the outer flange, said rings having springs for urging same apart, a resilient sleeve around the telescopic flanges and imbedded in said rings, and engaging lugs formed on the inner face of said rings for maintaining the circumferential relationship of said rings.

2. In a bearing seal of the class described a pair of spaced concentric rings, said rings having telescopic flanges formed on their adjacent sides and having driving lugs on both rings engaging each other and fixing the circumferential relationship of said rings, said telescopic flanges having a sealing element therebetween, and a sealing sleeve disposed around said telescopic flanges and secured to said rings in a manner to limit the separation thereof, and springs disposed between said rings for urging said rings apart.

References Cited in the file of this patent

UNITED STATES PATENTS

| Number | Name | Date |
| --- | --- | --- |
| 1,720,920 | Nesbitt | July 16, 1929 |
| 1,866,967 | Durham | July 12, 1932 |
| 2,243,255 | McDonald | May 27, 1941 |
| 2,301,723 | Vedovell | Nov. 10, 1942 |
| 2,564,070 | Krug | Aug. 14, 1951 |